Jan. 13, 1953
P. J. GRAHAM
2,624,907
HINGE FOR MOLDED PLASTIC PARTS AND
A METHOD OF MAKING THE SAME
Filed July 15, 1949
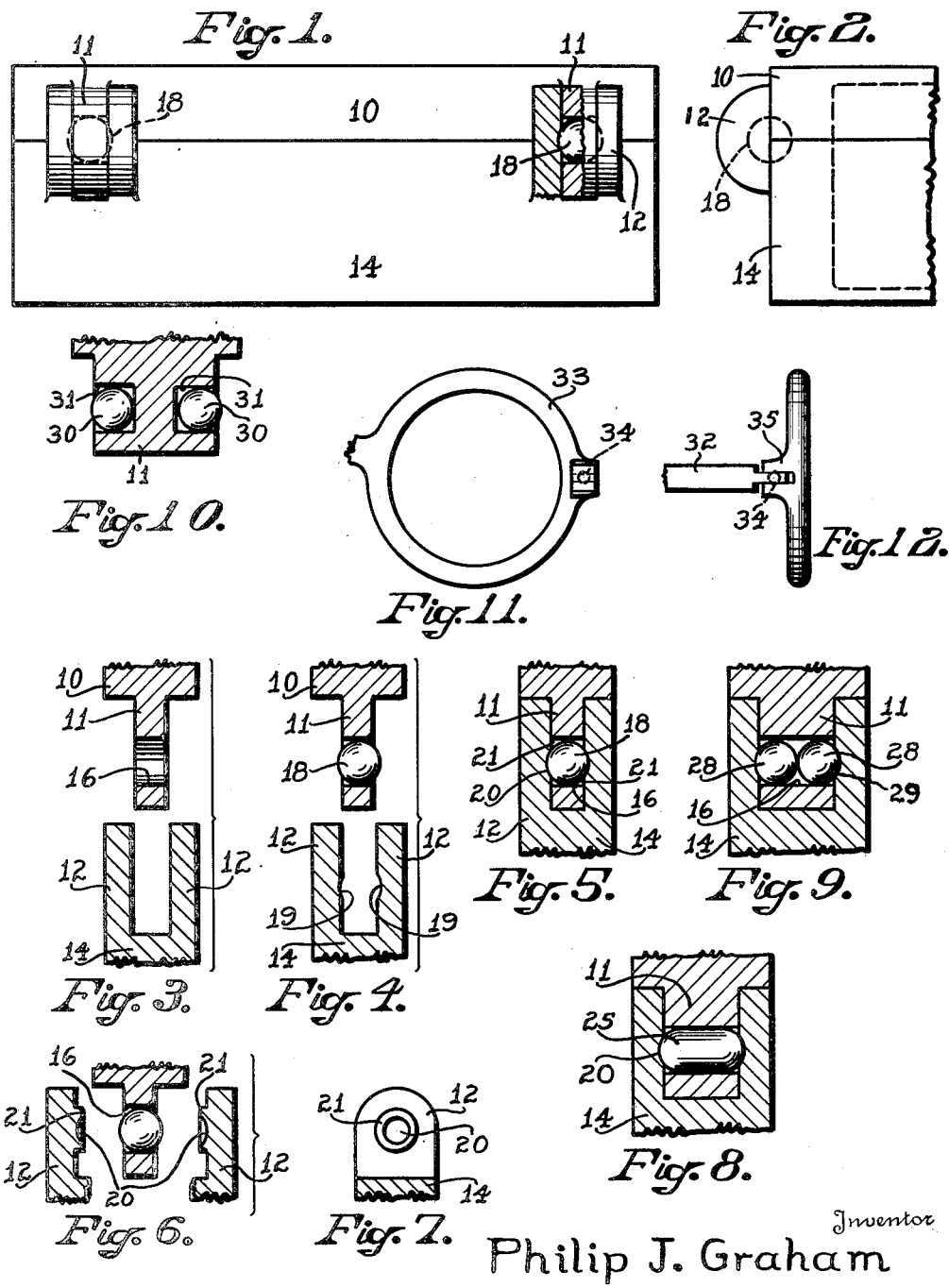
Inventor
Philip J. Graham
By Clayton L. Jenks
Attorney Patented Jan. 13, 1953

2,624,907

UNITED STATES PATENT OFFICE 2,624,907

HINGE FOR MOLDED PLASTIC PARTS AND A METHOD OF MAKING THE SAME

Philip J. Graham, Worcester, Mass., assignor to Trig Corporation, Worcester, Mass., a corporation of Massachusetts Application July 15, 1949, Serial No. 104,968

5 Claims. (Cl. 16—128)

This invention relates to a hinge, and more particularly to a hinge for connecting two molded plastic parts and to a method of making the same.

Owing to the nature of the standard molded plastic materials used for making boxes and other hinged articles, various problems are presented in providing a hinged joint therefor. It is common to make such a hinge of all-metal parts which are suitably secured to the plastic container and cover that form the box. In my Patent No. 2,435,272, I have provided a plastic box having an interfitting bearing and a knuckle which are held together by a resilient metal spring. This requires a special box construction if the hinge is to be permanent or incapable of disassembly, and it involves various problems of manufacture as well as expense.

The primary object of this invention is to provide a simplified form of a hinge for securing plastic parts together and which may be easily and economically assembled and will provide a non-removable hinge assembly that will give a long life of useful service.

A further object is to provide a satisfactory method of making such a hinge. Other objects will be apparent in the following disclosure.

In accordance with my invention, I form a hinge of two relatively pivoted lugs, such as a single lug or knuckle interfitting between the two lugs or arms of a yoke, one lug carrying a pivot having a rounded or part spherical surface projecting therefrom into a concave pivot seat in the other lug. The hinge pivot may be a spherical metal ball or a pin having a rounded convex end seated in a cylindrical recess or a suitable cavity in one lug and projecting therefrom by less than the radius of the pivot. The contiguous side face of the other cooperating hinge lug has a concave or part spherical seat into which the ball projects. The two lugs carrying the pivot therebetween have portions provided with preferably parallel faces in close contact to form a tight hinge joint and prevent axial movement of the parts.

According to one aspect of my invention, I assemble the ball or pivot pin by making one of the hinge lugs of a resilient material which permits the projecting portion of the pivot to spring the lug axially and so become seated in a pre-made bearing concavity without gouging a groove or otherwise injuring the hinge part materially. According to another aspect of my invention, I utilize the plasticity of a thermoplastic material, including the slight plasticity of many thermosetting plastics, whereby the concave bearing seat is formed during assembly of the parts by causing sufficient plastic flow of the lug material under pressure applied through the pivot sphere or pin, which is either hot or cold, so that the pivot is locked in a bearing recess formed in situ which exactly fits the pivot. The pressure may be caused by the resiliency of a hinge lug when sprung laterally by assembly of the pivot, or the pressure may be externally applied. The metal pivot may be heated, either before or during assembly to soften a thermoplastic hinge material and cause ready deformation under the assembly pressure.

Referring to the drawings illustrating various embodiments of my invention:

Fig. 1 is a rear elevation of a hinged box, partly broken away, to show the hinge construction;

Fig. 2 is a fragmentary side elevation thereof;

Fig. 3 is a fragmentary diagrammatic view of two hinge parts ready for assembly, where the bearing socket is to be formed in situ under the assembly pressure;

Fig. 4 is a similar view showing preformed bearing sockets having a metal pivot ball therein;

Fig. 5 is a similar view after the parts of Fig. 4 have been fully assembled with a pivot ball;

Fig. 6 is a fragmentary exploded view of the Fig. 3 construction, which exaggerates slightly the concave pivot recesses formed in the yoke arms of the hinge;

Fig. 7 is a fragmentary elevation of the inside of one of the yoke arms of Fig. 6;

Fig. 8 is a view similar to Fig. 5 in which an elongated pin is substituted for the ball;

Fig. 9 is a view similar to Fig. 5 showing a wide hinge lug having two pivot balls mounted therein;

Fig. 10 is a fragmentary view showing two balls in shallow recesses in a hinge lug;

Fig. 11 is a fragmentary view of part of a molded plastic spectacle or eyeglass frame embodying this hinge construction; and Fig. 12 is a side view of the spectacle frame.

As illustrated in Figs. 1 to 6 one of the box parts, such as the cover 10 of Fig. 1, is provided with a lug or knuckle 11 shaped to interfit snugly between two spaced yoke arms 12 of the other box part, such as the containers 14. The lug may be inserted with a sliding fit between the yoke arms and only with enough clearance between the contiguous faces to make a satisfactory joint which will not be loose axially. The lug and yoke arms may project from the rear of the box, as shown in Figs. 1 and 2, or two single cooperating lugs or pairs thereof may be formed on the box and cover. They may be otherwise arranged so that the pivot axis will lie in the plane of the rear face of the box, or as desired. The lug 11 is provided with a pivot socket 16, which may be a cylindrical aperture through the lug, aligned axially with the hinge axis.

The hinge pivot is a ball 18 or equivalent structure which fits into the socket 16, and the depth of the socket is such that the ball projects slightly on each side of the lug by less than a radius thereof, as shown in Fig. 4. The size of the pivot ball may be varied widely, but for small molded plastic boxes I prefer to use a steel ball of ⅛ to ¼ inch diameter which is made in a ball grinding machine and has a smooth surface of accurate shape. The socket dimensions are such that the ball fits fairly snugly in the socket, and it may or may not turn therein during normal use. This ball is seated in preformed concave sockets 19 (Fig. 4) or in sockets 20 (Fig. 6) formed in situ. The lug 11 may be made of any suitable material, such as a molded polymerized resin, either thermosetting or thermoplastic, which is hard and strong enough to support the ball satisfactorily. The yoke arms are also made of a resilient body capable of bending during assembly and may be a plastic flowable material capable of deforming enough to provide a bearing socket in situ but thereafter resist separation of the parts and not wear unnecessarily. A suitable material for either manner of assembly is a thermoplastic resin, such as a polymerized vinyl resin, and particularly polystyrene, but other moldable plastics may be used. The ball diameter is materially greater than the width of the space between the yoke arms, but the chosen plastic material is sufficiently elastic, yielding or resilient to allow the pivot ball to be thrust into an axial position between the yoke arms.

If the concave bearing recesses 19 are to be premolded before assembly of the hinge and when the yoke 12 and associated box parts are formed in the molding machine, then assembly of the hinge parts is accomplished simply by forcing the lug 11 and its ball 18 downwardly between the yoke arms (Fig. 4). The resiliency of the yoke arms as well as of the adjacent box walls permits the arms to spring apart under the wedging action of the projecting surfaces of the ball, so that the ball may be readily seated and particularly if done by a power mechanism. The sockets 19 are premolded to fit accurately against the projecting ball surfaces and form well fitting pivot seats for the hinge ball. The hinge joint as thus assembled is strong and can be pulled apart only with difficulty, so that the pivot may be considered as irremovable and permanently positioned. The ridge 21 (Fig. 6) may be omitted or premolded, as desired.

The other method of assembly is shown in Figs. 3 and 6, wherein a plastic flow or deformation of the yoke resin is produced by pressure of the ball against the inner flat surfaces of the yoke arms. This may be aided by heating the pivot ball, either before or after assembly, enough to cause it to soften the plastic. The pivot ball becomes embedded in the inner face portion of the yoke and forces the displaced material outwardly or in the only direction offering freedom of flow. The ball is made of metal, such as steel, which will hold heat for the purpose without being detrimentally affected during use. The heated ball does not plow a groove to an appreciable extent across the yoke face during assembly because of the extensive round surface of the ball engaging the yoke and since the resilient yoke arms are bent or sprung apart by the ball. The pressure of the yoke arms, as well as the heat of the ball, tends to form a ring of raised material which gradually builds up as the heat softens the plastic resin and so provides a complete bearing annulus 21 around a concave depression 20 of part spherical shape. Thus, the pivot ball builds its own bearing seat in situ, and the depression 20 and the ring 21 will so interlock with the pivot ball that the hinge parts cannot ordinarily be disassembled without breaking off one of the yoke arms.

The dimensions of the ball and its socket 16 in the lug 11 are so coordinated that the exposed surface portions of the ball will project less than a radius of the ball but far enough to form a suitable bearing seat. The displaced plastic flows outwardly and builds up the ridge 21 within the space limits provided. The annular ridge 21 should fit into the free space between the hinge parts and particularly in the annular space around the ball in its hole 16 without frictionally binding the hinge members. For example, both of the hinge parts may be made of polystyrene, and the lug may be 0.105 inch wide at the aperture 16 and the interlocking hinge ball 0.125 in diameter. The width of the slot in the bifurcated member or yoke 12 may be only slightly greater than the width of the lug to permit a sliding fit; hence substantially all of the projection of the ball will press into the yoke arms. If the lug with its associated steel sphere 18 is forced into the slot between the yoke arms, the plastic material of the yoke will yield resiliently and permit ready assembly. But the resilient yoke arms which fit fairly tightly against the lug 11 will grip the projecting portions of the pivot ball between them and so provide a pressure that tends to force the ball gradually into the plastic.

This plastic flow of the yoke member may be caused automatically or by externally applied pressure which forces a cold pivot ball to be embedded in the yoke member, such as by gripping the outer surfaces of the yoke between clamps or other suitable pressure devices. However, I prefer to employ heat for the purpose. To that end, I may heat the pivot ball initially before assembly in the hinge lug to a suitable temperature, such as about 400° F. Owing to the retention of heat by the steel ball, as well as the slowness with which the plastic body is heated thereby, I may force the pivot ball into position without melting a groove in the yoke arms. Thereafter, the pivot gradually displaces the plastic material of the opposite surface portions of the yoke and becomes embedded therein. Instead of preheating the pivot, I may assemble the parts with the pivot ball in the cold state and thereafter subject the assembled hinge to external heating forces, such as electromagnetic induction which generates eddy currents in the ball and heats it; or I may otherwise heat the pivot and cause it to become embedded by the plastic flow of the hinge part.

A polymerized styrene plastic may be molded at about 350° F., and I adopt this temperature or one somewhat higher, such as up to 450° F., as being preferred for the temperature of the pivot ball. A vinyl acetate plastic will require a somewhat lower temperature. If the ball of the dimensions above described is employed, a large number of these balls may be heated on an electrical hot plate to about 350° to 450° F. and then assembled by mechanical means, so that they need not be touched by human hands. By the time the ball gets into the plastic and the parts have been fully assembled, the temperature will have dropped to one which is so low that there will be no surplus heat, as it were, to enlarge the joint or cause any undesired plastic flow beyond that of making the bearing seat. These temperature conditions may be widely varied, depending upon the type of plastic employed as well as the size and material of the ball and the amount of plastic that must be flowed to form the bearing seat.

After the ball has been inserted in the cavity of the lug, and preferably by a mechanical device, the hinge parts are shoved together. This is done easily because of the slight resiliency of the yoke arms. Once the parts have reached their final positions with the ball centered on the hinge axis, the ball starts softening the resin and causes a thermoplastic flow of the material outwardly and laterally to form the bearing seat and permit the ball to sink into the yoke arms to the required depth. A material such as polystyrene is sufficiently plastic at the temperature of the ball so that the steel ball above described will develop the required holding association with the yoke part within such a short time that the hinge joint becomes permanent while the operator is assembling the parts. Hence, there is no delay in this assembly.

The lug 11 may be provided with a cylindrical aperture by drilling the lug or preferably by coring the part in the initial molding operation. The aperture diameter is only slightly greater than the ball diameter to permit ready assembly and provide substantially a tight fit. Its length is less than the ball diameter but such that the ball is supported diametrically within the socket 16 and projects by less than its radius as required. For example, the ball may be 0.020 inch greater in diameter than the thickness of the lug 11 which carries it or the width of the space between the yoke arms, as above stated. Hence, the sphere will project by 0.010 inch on each side of the lug and sink into the yoke arms by that distance. This distance of projection of the pivot sphere is less than the bending or lateral spreading capability of the resilient yoke arms, so that the ball may be forced laterally into an assembled position by springing the arms as described. The quantity of material removed, or the volume of the concave depression below the plane of the yoke face, equals the volume of the material in the raised annulus 21. For the sizes indicated, that gives adequate strength in the hinge joint for small boxes, spectacle frames and other light bodies. Larger boxes will merely require larger pivots or more of them.

It is immaterial as to whether the ball rotates within its socket in the lug or within the concave recesses of the yoke, or both. It, however, is presumed that the ball causes some plastic flow in the lug sufficient to form a strong adhesion between the plastic resin lug and the large surface of the ball within the cavity 16 and thus hold the ball rigidly in position in the lug. The convex portions of the ball that project beyond the lug have a small area compared with the area embedded within the lug, so that the projecting face portions will move freely relative to the assembled yoke parts and thus form a hinge.

Although the parts were assembled by resiliently forcing the yoke members apart, yet that does not easily take place in reverse and permit the hinge to become accidentally disassembled during use. This is due primarily to the fact that the raised ridge 21 of plastic that has flowed up around the convex projecting sides of the ball forms a concave bearing seat which is so deep that the pivot ball of the hinge joint will not pull out of the socket, as is evidenced by the fact that the lugs or yoke parts will break before the hinge parts can pull away from each other. Hence, the assembly is permanent. The construction of Fig. 4 likewise forms a hinge that can be disassembled only by the use of strong force and the hinge ball may be considered as substantially irremovable. It is out of sight or concealed and there is no part which can be easily removed, as is the case with a standard hinge pin.

It will now be appreciated that the pivot of the ball-and-socket joint may comprise an elongated body, such as a rod having rounded or convex ends which are substantially spherical where exposed. As shown in Fig. 8, I may employ a cylinder 25 made of iron or other metal. This longer type of hinge member may be used where it is necessary to have a very thick lug 11 for strength, but the principle of the invention is the same. Since the cylindrical pivot rod or pin 25 has convex ends, it cannot gouge a groove or cut into the plastic material of the yoke during assembly. The pin or rod should project beyond the ends of the hole through the lug 11 to substantially the same extent that a sphere projects so that its ends act like the exposed face portions of the sphere. A strong hinge having a wide lug may also be made as shown in Fig. 9, in which the lug 11 has its aperture 16 made of such dimensions that it will carry two balls 28 with their outer face portions projecting and arranged to be seated in the bearing seats 29 of the yoke arms. Also, as shown in Fig. 10, the lug or knuckle 11 may be made still wider, and two balls 30 are mounted in outwardly opening recesses or cavities 31 in the lug. These recesses may be formed by coring or by drilling. They are circular in cross section and of such depth that the balls will project to the required extent as above described. Also, the bearing seats are preferably pre-molded. It will also be appreciated that these structures may be reversed to have balls or pins mounted on the yoke arms and projecting inwardly into bearing seats in the adjacent faces of the lug. The box structure shown in Fig. 1 has two spaced hinge structures as above described; but if desired, a larger number of ball and socket joints may be spaced across the box to give the needed strength.

This hinge structure is applicable to various types of articles made of plastic material. For example, I have shown in Figs. 11 and 12 how each bow 32 may be fastened to the plastic frame 33 of spectacles or eyeglasses by a similar construction. In this case, the pivot ball 34 is mounted in the end of the bow the same as is shown in Fig. 4, and the spectacle rims have slotted projections which form the yoke. The concave pivot bearing seats may be premolded, or they may be formed in situ, as above described.

In each of the constructions illustrated, the lug or knuckle and the associated arm that carry the metal pivot sphere between them have their faces substantially in contact adjacent to the hinge pivot, but the resiliency of the plastic material permits separation of the hinge arm from the lug when the pivot sphere is forced into its final axial position, whether the concave socket is premade or is formed in situ. Hence the pivot cannot gouge or cut a groove in the plastic material as it is moved first into axial position and then sinks axially into its bearing arrangement. Since the pivot sphere interfits with a part spherical bearing recess of substantially the same radius, it is tightly positioned by the resiliency of the box parts and the cover cannot move laterally, nor can the pivot be dislodged by or during any normal movement of the hinge parts.

It will be appreciated that many other modifications may be made in the structure of the hinge and that various types of plastic or flowable materials may be employed. Hence, the above description is to be interpreted as setting forth the preferred embodiments and methods of procedure and explaining the principles underlying this invention, without imposing limitations on the appended claims.

This case is a continuation in part of my copending application Serial No. 20,637, filed April 13, 1948.

I claim:

1. The method of making a hinged plastic article comprising the steps of shaping resilient plastic material to form a knuckle and cooperating yoke arms forming parts of a hinge, portions of which have rotatively interfitting substantially contiguous parallel plane faces, providing one hinge part with a round axial aperture, mounting a spherical metal pivot in the aperture in a projecting relationship, forcibly assembling the knuckle between the yoke arms and moving the pivot laterally of the hinge axis to its final axial position, while resiliently spreading the two yoke arms apart sufficiently for introducing the pivot without materially gouging the face of the other plastic hinge part over which the pivot is forced, and causing pressure to embed the pivot substantially solely by axial movement into the plastic material of the other hinge part and form a concave bearing socket interfitting with the pivot by displacing the plastic material outwardly and concentrically around the pivot.

2. The method of making a hinged plastic article comprising the steps of molding resilient thermoplastic material to form a knuckle and yoke arms, portions of the knuckle and arms having parallel faces that are substantially in contact and rotatively interfit, and providing the knuckle with an axial cylindrical aperture, providing a spherical metal pivot which will fit in and normally project from the aperture, heating the pivot to a temperature which will cause deformation of the thermoplastic material, assembling the heated pivot in the aperture in a fixed projecting relationship, forcing the knuckle laterally between the yoke arms and quickly moving the pivot over the arm faces to its final axial position by resiliently springing the yoke arms apart without materially gouging the plastic material and causing the pressure of the resilient arms to embed the heated pivot in the yoke arms by an axial movement which displaces the plastic material outwardly as an annular ridge projecting into the aperture and thereby forming a concave depression which interfits with and serves as a bearing seat for the pivot.

3. A molded plastic resin box having two parts forming a receptacle and a cover, a hinge therefor comprising an arm and a knuckle of molded plastic resin which are respectively integral with said box parts, portions of the knuckle and arm having substantially contiguous, rotatively interfitting, parallel plane faces, the arm having a concave bearing socket and the knuckle having a round aperture of the same radius axially aligned with the socket, a spherical metal pivot of substantially said radius supported freely in and projecting from the aperture which is interfittingly and freely seated in said socket, the arm socket having a continuous uninterrupted concave face around the pivot, and said hinge arm, knuckle and the box parts being so constructed and of sufficient resiliency to hold said faces normally in contact and yet permit the knuckle and arm to be resiliently spread apart during assembly of the pivot so that the projecting pivot may be moved only laterally over the arm into axial alignment with the hinge axis without movement along the hinge axis or gouging the arm face materially.

4. A molded plastic resin box having two parts forming a receptacle and a cover, a hinge therefor comprising a knuckle on one part and yoke arms on the other which are each formed of a molded resilient plastic resin integral with the associated box part, portions of said knuckle and yoke arms having substantially contiguous, rotatively interfitting, parallel plane faces, the knuckle having a circular aperture opening at each side face and the resin arms of the yoke having uninterrupted concave bearing sockets facing inwardly towards and axially aligned with the knuckle aperture, at least one spherical metal pivot having substantially the same radius as that of the aperture and socket which is freely supported in the knuckle aperture and projects at each side thereof, the projecting pivot portion rotatively and freely interfitting with the associated socket when the knuckle and yoke arms are substantially in contact, and said yoke arms and box parts being so constructed and of sufficient resiliency as to hold said faces of the knuckle and yoke arms normally in contact but permit the arms to spread apart and provide for assembly of the pivot by movement over the inner arm faces only laterally of the hinge axis into the adjacent socket without movement along the hinge axis or gouging the arm faces materially.

5. A hinge according to claim 4 in which the aperture in the knuckle is cylindrical and the socket is formed in part by a ridge of plastic material above the plane face of the yoke arm which surrounds and interfits with the pivot and projects into the space around the pivot in the cylindrical aperture of the knuckle.

PHILIP J. GRAHAM.

REFERENCES CITED

The following references are of record in the file of this patent:

UNITED STATES PATENTS

| Number | Name | Date |
|---|---|---|
| 2,145,143 | Trecartin | Jan. 24, 1939 |
| 2,247,558 | Nichols | July 1, 1941 |
| 2,398,573 | Becker | Apr. 16, 1946 |
| 2,460,488 | Brunetti | Feb. 1, 1949 |
| 2,464,524 | Nathan | Mar. 15, 1949 |

FOREIGN PATENTS

| Number | Country | Date |
|---|---|---|
| 12,470 | Great Britain | June 3, 1898 |